Feb. 27, 1934. P. W. DES ROCHES 1,948,846
ELECTRIC REFRIGERANT COMPRESSOR
Filed July 27, 1929 7 Sheets-Sheet 1
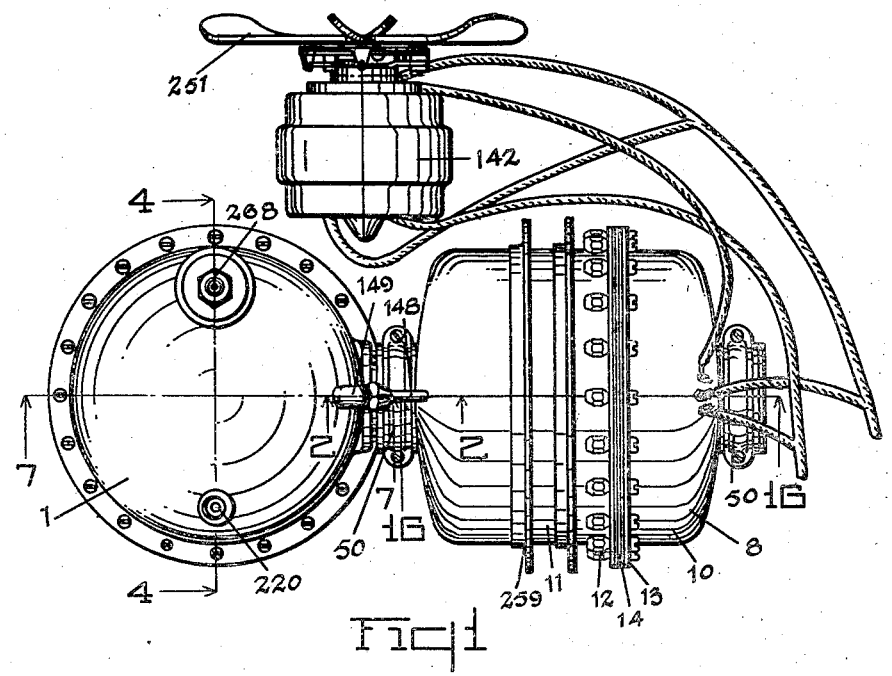
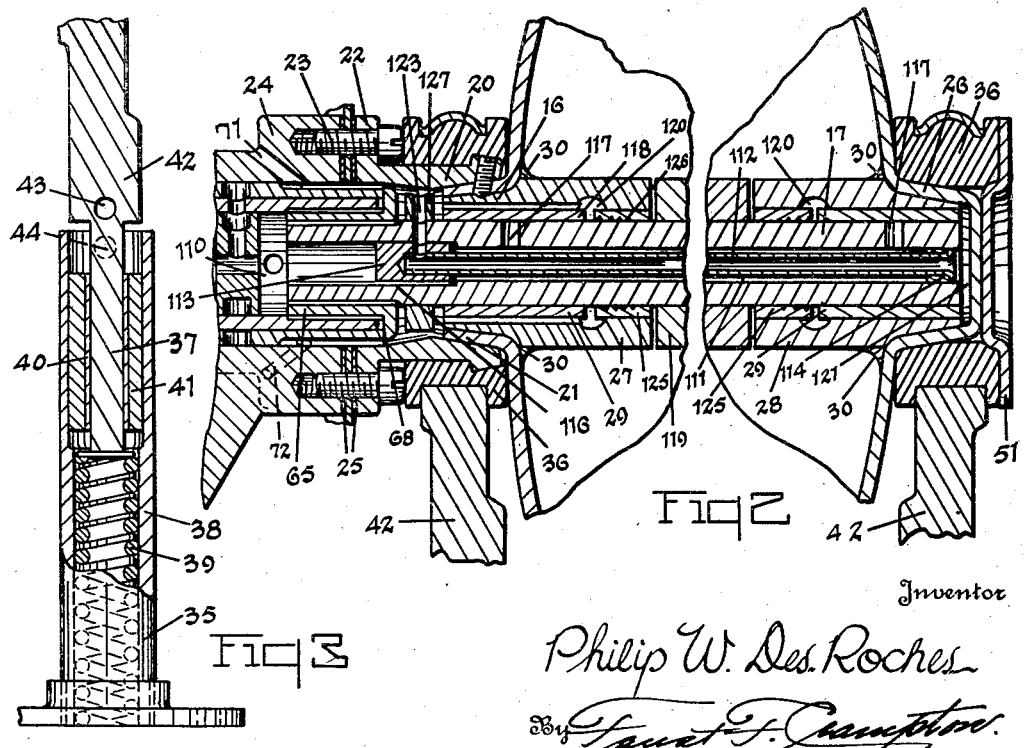
Inventor
Philip W. Des Roches
By [signature]
Attorney

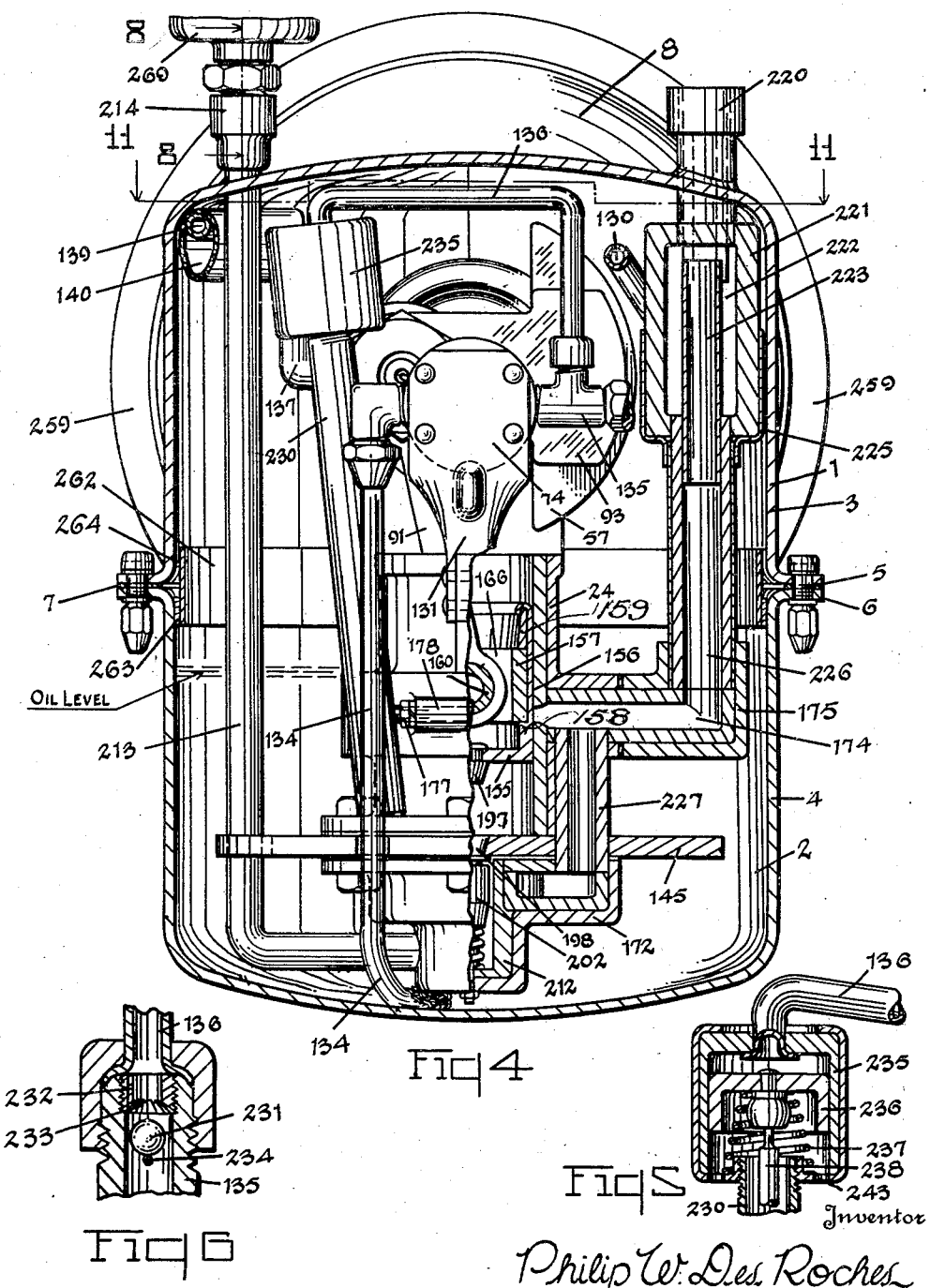

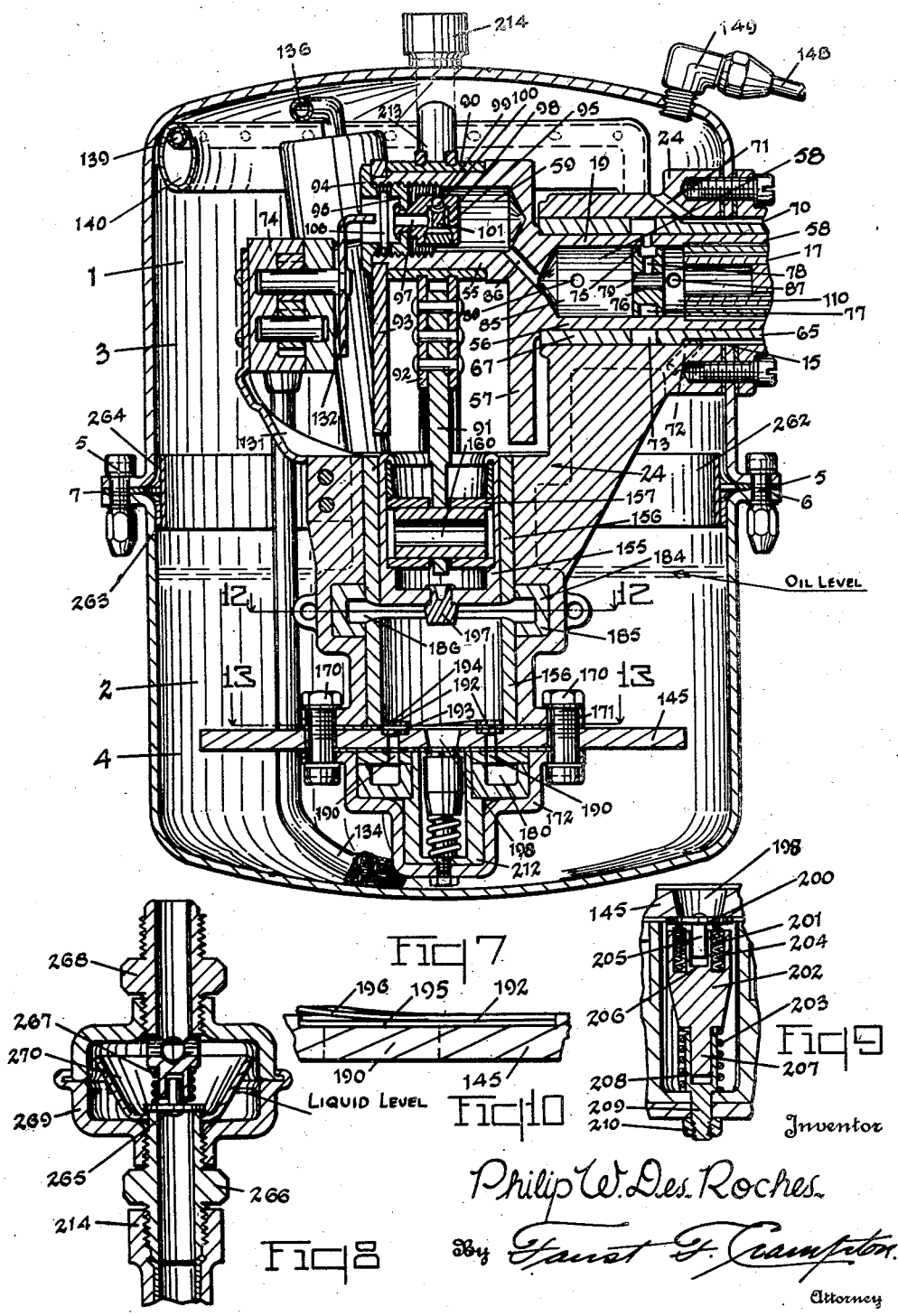

Feb. 27, 1934.   P. W. DES ROCHES   1,948,846
ELECTRIC REFRIGERANT COMPRESSOR
Filed July 27, 1929   7 Sheets-Sheet 4
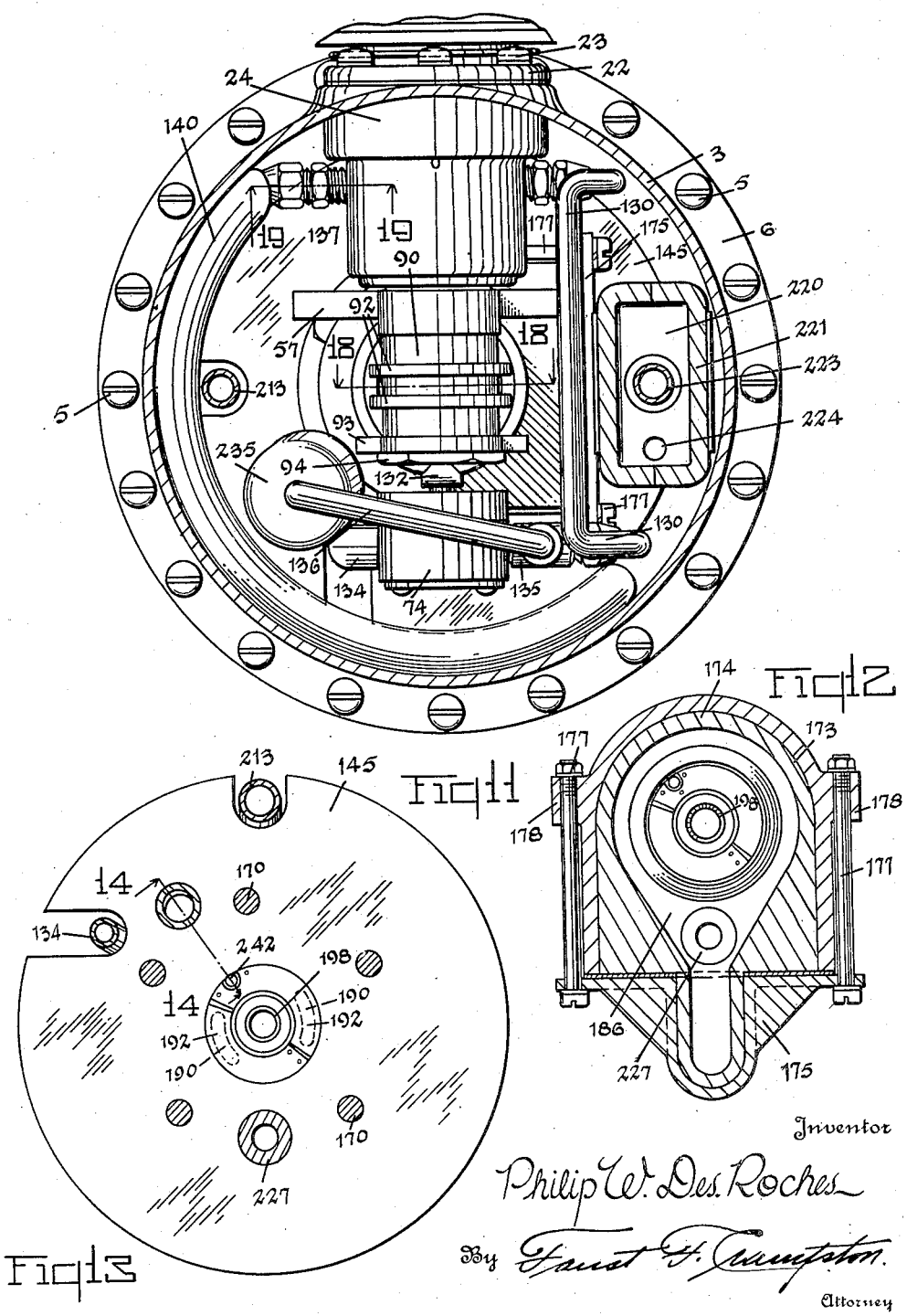
Inventor
Philip W. Des Roches
By Faust F. Crampton
Attorney

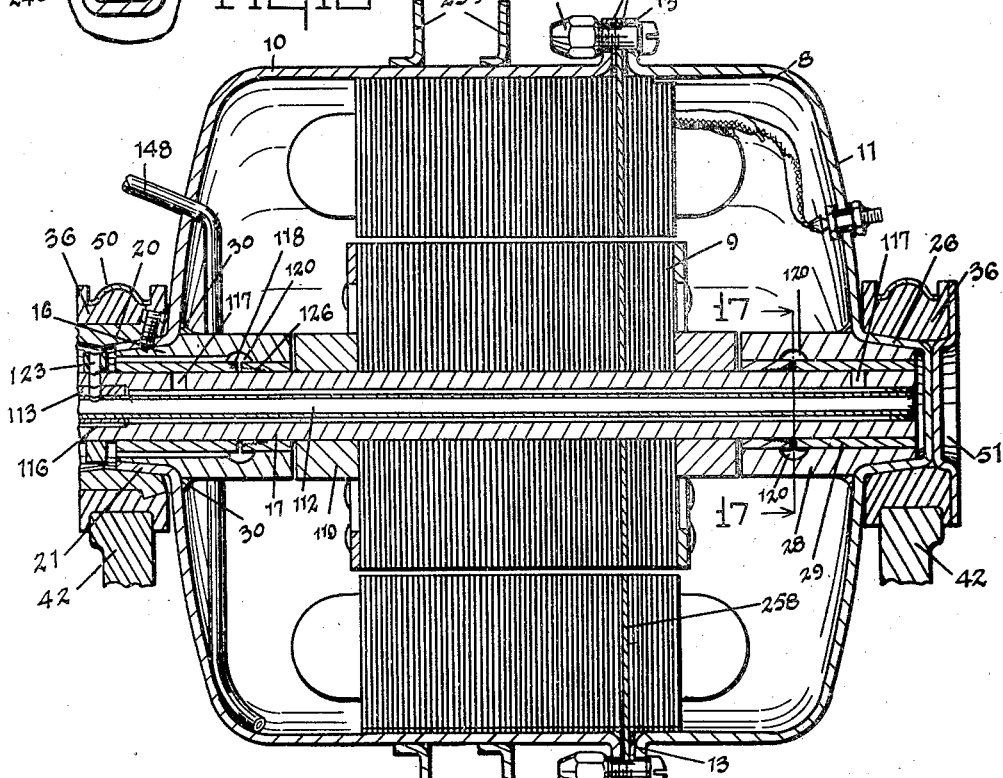

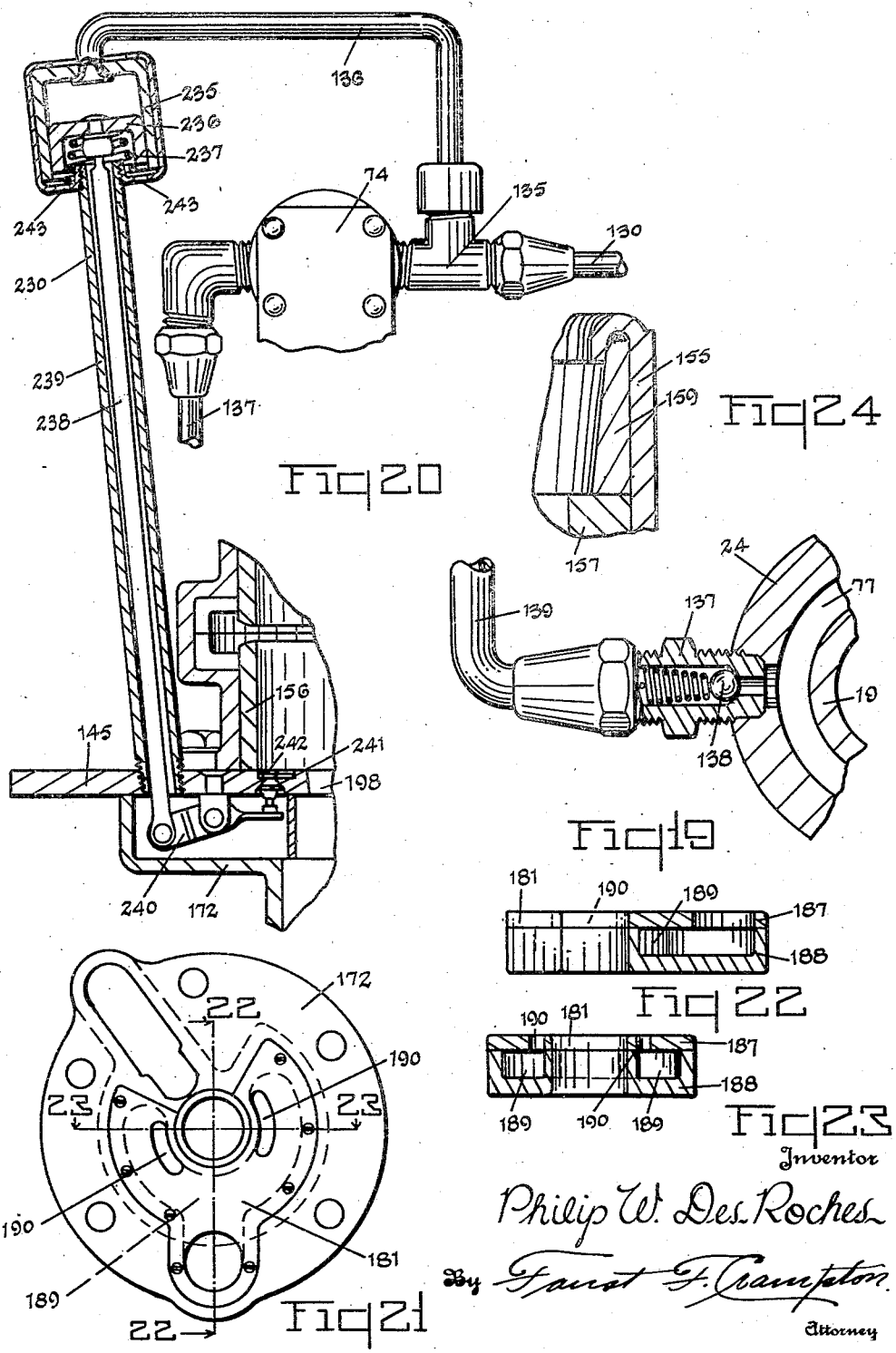

Feb. 27, 1934.   P. W. DES ROCHES   1,948,846
ELECTRIC REFRIGERANT COMPRESSOR
Filed July 27, 1929   7 Sheets-Sheet 7
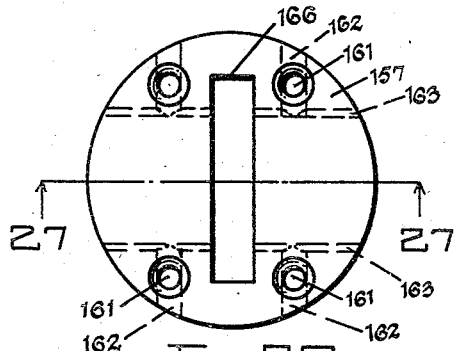
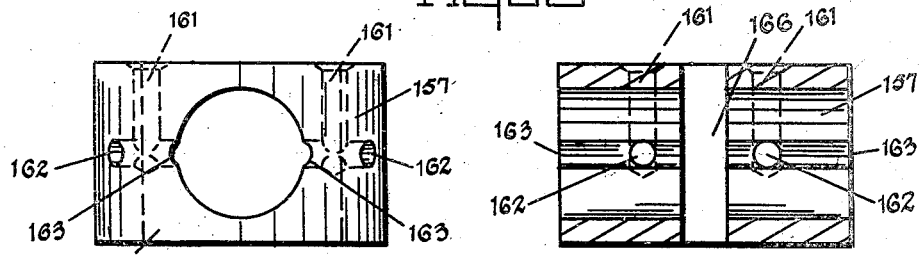
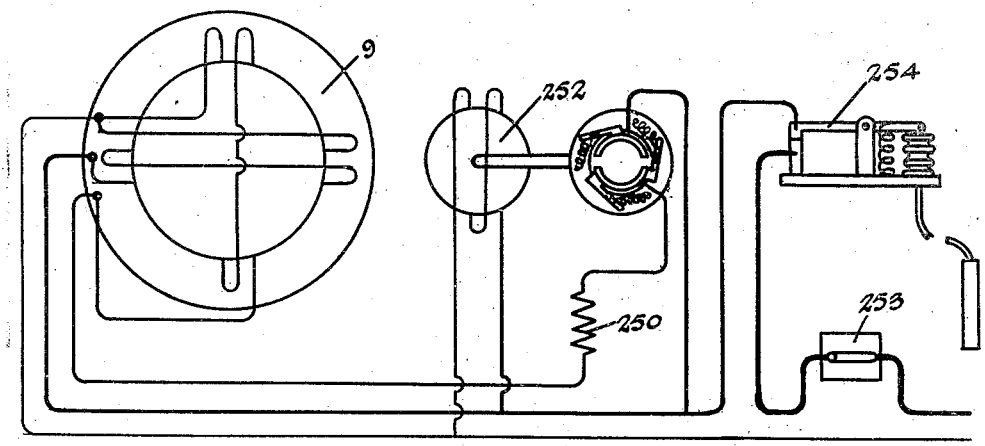
Inventor
Philip W. Des Roches
By Faust F. Crampton
Attorney Patented Feb. 27, 1934

1,948,846

UNITED STATES PATENT OFFICE 1,948,846

ELECTRIC REFRIGERANT COMPRESSOR

Philip W. Des Roches, Detroit, Mich.

Application July 27, 1929. Serial No. 381,650

12 Claims. (Cl. 230—58)

My invention has for its object to provide a means for completely enclosing an electric compressor of a refrigerating system and a motor in sheet metal casings to eliminate gas leakage, and wherein means is provided for dissipating waste heat of the motor to the outside atmosphere and away from the refrigerating circuit, and for utilizing a large part of the waste heat of the compressor and also dissipating a large part to the atmosphere.

A further object of the invention is to so construct the motor and the compressor as to prevent heating of the returned refrigerating material by the waste heat of the motor and the compressor. The invention also provides means for collecting the refrigerant and lubricant that escapes from the refrigerating circuit and returning it to the circuit.

The invention also provides a simple and efficient means for unloading the compressor and enabling periodic starting of an induction motor and which may consequently be used for operating the compressor. The invention also provides a means for preventing the introduction of any liquid, either refrigerant or lubricant, into the compressor cylinder which may otherwise be damaging to the compressor or produce objectionable hammering in the operation of the compressor. The invention further provides means for completely separating all the refrigerant from the lubricant for maintaining the viscosity and, consequently, the lubricating efficiency of the lubricant.

The invention also provides an efficient thermic split phase motor control which operates to dissipate the waste heat of the compressor and the motor. The invention also provides a means for supporting the motor and the compressor assembly, whereby substantially all vibration will be absorbed.

The invention also has for its object to provide other advantages and features that will appear upon examination of the drawings and from the description of the invention hereinafter set forth.

The invention may be contained in structures of different forms and, to illustrate a practical application of the invention, I have selected a structure as an example of the various embodiments of my invention, and shall describe it hereinafter. The particular construction selected, as an example, is shown in the accompanying drawings.

Fig. 1 is a top view of the motor and compressor and enclosing means, and the combined cooling and split phase motor controlling device. Fig. 2 is a broken view showing the motor bearings and means for conducting the lubricant from the compressor through the motor bearings and back, taken on the plane of the line 2—2 as indicated in Fig. 1. Fig. 3 is a view illustrating a lower part of the motor and the compressor supporting means. Fig. 4 is a view of a section taken on the plane of the line 4—4 indicated in Fig. 1. Fig. 5 is a view of a cross section of the unloader cylinder. Fig. 6 is a view of a cross section of a ball check valve. Fig. 7 is a view of a section of the compressor taken on the plane of the line 7—7 indicated in Fig. 1. Fig. 8 is a view of a section of the oil trap check valve taken on the plane of the line 8—8 as indicated in Fig. 4. Fig. 9 is a view of a section of an outlet valve of the compressor. Fig. 10 is an edge view of the inlet valves. Fig. 11 is a top view of the compressor and a view of a section taken on the plane of the line 11—11 indicated in Fig. 4. Fig. 12 is a view of a section of the compressor taken on the line 12—12 indicated in Fig. 7. Fig. 13 is a view of a section of the compressor head taken on the plane of the line 13—13 indicated in Fig. 7. Fig. 14 is a view of a section taken on the plane of the line 14—14 indicated in Fig. 13 and illustrates a part of the unloader. Fig. 15 is a view of a section taken on the plane of the line 15—15 indicated in Fig. 14 and shows an end view of a part of the automatic unloader. Fig. 16 is a view of a section of the motor taken on the plane of the line 16—16 indicated in Fig. 1. Fig. 17 is a view of a section taken on the plane of the line 17—17 indicated in Fig. 16 and illustrates the oil return grooves in the outer motor bearing. Fig. 18 is a view of a section taken on the plane of the line 18—18 indicated in Fig. 11, and shows the crank bearing and oil lead. Fig. 19 is a view of a section of the oil pressure regulating valve taken on the plane of the line 19—19 indicated in Fig. 11. Fig. 20 is a view of a section of an automatic unloader of the compressor to enable starting of the motor. Fig. 21 is a top view of an auxiliary compressor cylinder head. Fig. 22 is a view of a longitudinal section of the thermic member taken on the plane of the line 22—22 indicated in Fig. 21. Fig. 23 is a view of a transverse section taken on the plane of the line 23—23 as indicated in Fig. 21. Fig. 24 is a fragmentary view of the top of the compressor piston. Fig. 25 is a top view of the piston pin block. Fig. 26 is a side view of the piston pin block. Fig. 27 is a view of a section taken on the plane of the line 27—27 indicated in Fig. 25. Fig. 28 is a diagram of the electric connections of the motor.

In the particular construction selected as an example of the various embodiments of the invention, the compressor and the motor are each located in individual sheet metal shells, that completely surround the compressor in the one case, and the motor, in the other case. The use of the sheet metal shells prevents the leakage of gases which renders such systems inoperative in a very short time. Castings invariably have pin holes and, consequently, are unreliable. The use of sheet metal shells does away with the use of castings. The compressor enclosing shell, furthermore, provides for the separation of the gas from the lubricant used in lubricating the compressor, at the compressor, and by the heat of compression. The shells are so connected together as to permit the movement of the lubricant between the compressor and the motor for lubricating their bearing parts and also to maintain a lubricating circuit as between the compressor and the motor. The shell of the motor prevents the escape of the refrigerant that may enter with the lubricant and at the same time separately encloses the motor to enable removal of the heat of the motor and thus prevent the heat of the motor from heating the refrigerant gas in the refrigerating circuit. The shell of the compressor, moreover, is located on the low pressure side of the refrigerating circuit and such refrigerant that enters the shell of the motor has the pressure of the low pressure side of the compressor or of the refrigerating circuit, thus preventing condensation of refrigerant in the motor shell. The shell of the motor is maintained at said pressure, without being in the stream of the refrigerating system, to enable the circulation of the lubricant through the compressor and the motor.

As shown in Fig. 1, the shell 1 completely surrounds the compressor 2. It is formed of two parts, 3 and 4, which are secured together by suitable bolts and nuts that extend through flanges 6. The flanges may be hermetically sealed by a gasket 7. The shell 8 is also formed of sheet metal and completely surrounds the motor 9. It is formed of two parts, 10 and 11, that are secured together by means of bolts and nuts 12 that extend through the flanges 13. The flanges are hermetically sealed by means of suitable gaskets 14. The shells 1 and 8 are provided with openings 15 and 16 and the motor shaft 17 extends through the openings 15 and 16. The shaft 17 is connected to the crank shaft 19 of the compressor.

The shells are connected together by means of a flanged sleeve 20 that surrounds a tapered flange 21 that is struck-up from the wall of the shell 8. The flanged sleeve 20 is also secured against a protruding circular flattened portion of the wall of the shell 1 by means of the flange 22, the bolts 23 and the frame 24 of the compressor. Suitable gaskets 25 may be interposed between the wall of the shell 1 and opposing parts of the sleeve 20 and the frame 24. The sleeve 20 is, preferably, formed slightly larger than the diameter of the shaft 17. The sleeve 20 is secured to the flange 21, preferably by a tapered fit, which is soldered and thus the shells are hermetically sealed and in accurate alignment with each other. The shell 8 is provided with a tapered protrusion 26, similar in form to the tapered flange 21 which, however, is closed at its outer end and forms a support for a bearing at the end of the shaft 17. Supporting members 27 and 28 for the bearings fit the inner surfaces of the tapered portions 21 and 26 and shaft bearing bushings 29 are located within the members 27 and 28. They are secured to the shells by arc welded spots, as at 30.

The shells and the mechanism contained therein, are supported by means of standards 35 having telescoping parts and elastic collars 36 that interconnect the upper ends of the standards 35 with the shells. The standards 35 are provided with the telescoping parts 37 and 38. The parts 37 are yieldingly supported by means of the compression springs 39 that are located intermediate the lower ends of the parts 37 and the lower ends of the parts 38. If desired, the parts 37 may be surrounded with bushings 40 that may be located within elastic sleeves 41. This construction permits free sliding movements of the parts 37, while the sleeves 41 provide elastic cushions to yieldingly resist any lateral play or cocking movement of the parts 37. In order to provide for shipment of the mechanism and to enable locking of the compressor assembly, and particularly of the parts 37 relative to the parts 38, the upper end portions 42 of the parts 37 may be formed cylindrical and have a diameter substantially the same as that of the inner diameter of the parts 38, so that the portions 42 may be forced into the parts 38 and, if desired, be secured by means of pins that may be inserted through holes 43 and 44 located in the parts 37 and 38.

The elastic collars 36 are, preferably, formed of elastic rubber and are secured about the protruding tapered portions 21 and 26 of the shell 8. Preferably, the collar 36, located intermediate the shells 1 and 8, fits the exterior of the flanged sleeve 20, while the other collar 36 fits the protruding tapered portions 26. The collars are secured in position by means of semi-circular clamping parts 50 that are bolted to the upper ends of the parts 37 of the standards. One of the collars 36 is located intermediate the wall of the shell and the flange 22 of the sleeve 20. The other of the bushings is located intermediate the wall of the shell and a disc 51, that is welded to the end of the protruding portion 26.

Since the crank shaft 19 of the compressor is securely connected to the shaft 17, and the frame 24 is securely connected to the shell 8, through the wall of the shell 1, the shells and the mechanisms contained therein, are elastically supported by the resilient parts 36 and 39. The axis of the cylinder of the compressor is located vertically, while the axis of the crank shaft of the compressor and the shaft of the motor are located horizontally and, consequently, the yielding members 39 yieldingly resist and absorb vibrations due to the reciprocatory movements of the crank shaft with the minimum amount of transmission of such movements to the base. The elastic sleeves 41 yieldingly resist any lateral movement due to the location of the compressor at one side of the standards 35. The elastic collars 36 yieldingly resist and absorb the vibrations due to the rotative movement of the crank which is connected to the piston through the link or connecting rod.

The compressor is of the overhanging crank type, in which the main crank bearing and the cylinder are cast in one piece and form the frame 24 of the compressor. It is preferably formed by die casting in order that the parts may be properly formed to produce the desired chambers and passageways at a low cost. It is enclosed in the sheet metal shell 1 to prevent the escape of any gas to the outside atmosphere.

The crank 55 is a forging and formed integral with the crank shaft 56 and also with the counterweight 57. The inside of the crank shaft is bored out, as at 58, and also the crank, as at 59, to form suitable oil chambers and passageways through the said parts. The motor shaft 17 is connected to the crank shaft 56 by a suitable serrated or splined member forced on the end of the shaft 17, and into the end of the crank shaft 56.

In the form of construction shown, the flanged bushing 65 is provided with suitable exterior and interior serrations that fit the exterior serrations of the motor shaft 17 and fit the interior serrations formed in the end of the crank shaft 56. If desired, the serrations on the surface of the bushing 65 may be made relatively small and when the bushing 65 is forced into the end of the crank shaft, they will tightly engage therewith and form interlocking serrations thereon. The crank bearing is formed of two bushings 66 and 67. The bushing 66 is pressed into the frame 24 of the compressor so as to engage the flange 68. While the end of the crank 56 extends to a point, preferably a little remote from the flange 68, to provide for the adjustment of the crank shaft 56 relative to the bushing 65, and particularly with reference to the shaft 17 by using suitable thin washers or shims.

The bushing 66 is provided with a plurality of longitudinal slots 70 located in the outer surface that lead from a circumferential slot that registers with an oil passageway 71 located in the upper part of the frame 24 and above the bearing part of the frame. It also registers with an opening 72 formed in the frame 24 at a point below the bearing part of the frame. The other bearing bushing 67 is pressed into the frame 24 and the lengths of the bushings 66 and 67 are such as to space their inner ends short distances from each other so as to form an annular passageway 73 around the exterior of the crank shaft 56. The passageway 73 receives oil from the oil pump 74. The crank shaft 56 is provided with an opening 75 which admits oil to the interior of the crank shaft 56. A partitioning block 76, having an annular slot 77 around its periphery, is located in the crank shaft 56 so that the hole 75 registers with the slot 77. The partitioning block 76 is provided with a radially extending hole 78 that communicates with a hole 79 extending axially through the center of the block whereby a passageway is afforded from the passageway 73 to the interior of the crank shaft 56.

The block 76 forms two chambers within the crank shaft 56 on each side of the block. The chambers are provided with openings 80 and 81 which enable lubrication of the bearing surfaces of the crank shaft 56 within the bushings 66 and 67. The chamber 85 is connected centrally by a passageway 86 that leads to the crank pin chamber 59. Owing to the fact that the hole 79 and the passageway 86 communicate with the chamber 85 at the axis of the crank pin, the oil that is fed thereto through the hole 79 will be retained therein when the crank is rotated and, consequently, the chamber 85 forms a storage for the oil during continued rotation of the crank. However, when the crank stops and again starts, some oil will be thrown through the passageway 86 that leads to the chamber 59 of the crank. This flow, however, will cease when the speed of the crank is sufficient to maintain the oil on the outside of the edges of the end of the passageway 86 where it connects with the chamber 85. Should the pump discontinue in its supply of the oil through the passageway 73, the chamber 85 will form a storage for the oil for a period of time of substantial length until the pump again operates to feed the oil through the passageways.

A sleeve 90 surrounds the crank pin and forms the crank bearing. It is connected to the connecting rod 91 by means of a pair of plates 92 that are forced over the sleeve 90 so as to engage in shallow circular slots formed on the exterior of the sleeve 90. The plates 92 are riveted to the connecting rod 91 after assembly of the piston into the compressor. The sleeve 90 is placed on the crank pin 55 and a counterweight plate 93, having serrations, fits over the end of the crank pin 55. A hollow cap screw 94 is secured into the end of the crank 55 to secure the plate 93, and in turn to secure the sleeve 90 in place.

The cap screw 94 is provided with a block 95 that is secured in the bottom wall 96 of the cap screw by having an end portion swedged over the edges of an opening formed in the bottom wall 96. The block is provided with a central passageway 97 and a chamber 98 and a hole 99 that is closed by means of a ball check valve 100. The block 95 is so located that the opening 99 will be in a radial line from the axis of the crank shaft. A weight 101, having slots for the movement of oil thereby, is located in the chamber 98 formed in the block 95 so as to press against the ball 100, due to the centrifugal force created by the rotation of the crank about the axis of the shaft. The valve 100 weighted by the weight 101, operates as a vent to the passageway of the oil that is formed immediately upon the cessation of the rotation of the crank shaft to relieve the oil pressure in the lubricating system created by the oil pump. This has an important advantage in that the motor is an induction motor and must be unloaded when starting and, as hereinafter described, the motor is unloaded by unloading the oil pump and also by unloading the compressor. This is done by releasing the pressure that is created by the oil pump and the compressor, one in the lubricating system and the other in the refrigerating system.

The oil that enters the chamber 59 of the crank pin passes to the bearing surfaces of the crank and the sleeve 90, through a hole 105 which is, preferably, located at a point other than one that is in a plane extending radially with respect to the crank shaft and the crank to prevent excess movement of the oil by the centrifugal force produced by rotation of the crank shaft. In the form of construction shown, it is located in a line extending at right angles to such a plane which is, also, a radial line of the crank pin 55. The hollow cap screw 94 is secured by suitable internal set screws 106.

The motor is lubricated by passageways that communicate with the chamber 110 located on the side of the partitioning block 76 opposite to that of the chamber 85. The shaft 17 is a hollow shaft, it being provided with a passageway 111. A tube 112 extends substantially the length of the shaft 17 and is located in the passageway 111. A cap 113 is located on the end of the tube 112 and substantially closes the said end. The other end of the tube is provided with a collar 114 which fits the exterior of the tube and the interior of the passageway 111. Preferably, the end of the tube is swedged over the end edge of the collar 114. The end of the shaft 17 connected to the crank shaft, is provided with a slot 116, that communicates with the chamber 110 to conduct the oil past the cap 113 and into the passageway 112. This permits the oil under pressure of the oil pump to pass into the passageway 111. The shaft 17 is provided with holes 117 that permit the lubrication of the exterior surface of the shaft and the interior of the bearing bushings 29. Outward flow or movement of the oil within one of the bushings 29 causes it to enter the interior of the flanged sleeve 20, whence it may flow back into the compressor shell 1. Movement of the oil through the opposite end of the bushing 29 is received by a channel 120 that is formed in the bearing support 27. Movement of the oil within the other bushing 29 towards the outer end of the shaft 17, causes it to flow into the chamber 121 formed within the protrusion 26 of the shell 8. The oil then returns through the tube 119. The cap 113 and the shaft 17 are provided with registering holes 123 which permit the return of the oil into the interior of the flanged sleeve 20 from whence the oil flows into the shell 1 and out through the passageway 72. The flow of the oil inwardly and within the bushing 29, causes it to enter the groove 120 formed on the inner surface of the bearing support 28. The interior surface of the bearing support 27, located at the outer end of the shaft 17, is provided with channels 122 that interconnect the groove 120 with the chamber 121 and the oil that passes the inner end of the outermost bushing 29 passes through the groove 120 in the channels 122 to the chamber 121 from whence it passes through the tube 119 and the holes 123 into the shell 1 and eventually through the passageway 72 to the bottom of the shell. The channels 122 are located in the plane of the axis of the shaft to maintain a level of the oil in the chamber 121 substantially at the height of the center of the tube 119. When the oil is not under pressure, there will, therefore, be no movement of the oil along the lower side of the bushing 29, although the chamber 121 is normally half full. When, however, the oil is under pressure, there will be a free outlet of the oil that may pass through the grooves 120 which permits substantially immediate return of the oil under pressure to the tube 119.

In order to prevent, as far as possible, the movement of the oil along the shaft and into the shell 8, a pair of bushings 125 are located within the inner ends of the bearing supports 27 and 28 and so that the inner ends of the bushings 125 are located within, or in proximity to, the grooves 120 and 123. The inner surfaces of the bushings 125 and the ends located in proximity to the grooves 120 and 123 are provided with spiral grooves 126 or female thread cut in a direction to resist movement of the oil towards the inner end of the bearing bushings 125. The grooves 126 are so formed that as the shaft 17 rotates, there will be caused the movement of the oil that might work into the bushings 125 outward into the grooves 120 and 123. The oil from the grooves 120 eventually enters the interior of the flange sleeve 20 and is conducted into the passageways 72 formed in the frame 24 of the compressor which directs it to the bottom of the shell surrounding the compressor.

A collar 127 is forced onto the end of the shaft 17 and is provided with a registering opening that communicates with the passageway formed by the holes 123. This forms a means for producing a suction on the oil by the rotation of the shaft 17 which draws the oil from the chamber 121 and, consequently, draws the oil from the channel 120. Also, the collar 127, being located at the end of the bushing 29, will operate to draw the oil that may be collected in the channels 118 by the centrifugal movement created by rotation of the shaft 17.

The oil pump 74 is connected by means of the pipe 130 which communicates with the interior of the bearing part of the frame 24 and between the bushings 66 and 67 which forms the passageway 73. The circuit of the oil is divided at this point by the block 75, a part flowing to the bearings of the motor and the other part flowing to the bearings of the compressor. The return is, as heretofore described, through the tube 119 and eventually through the passageway 72 in the frame 24 of the compressor to the bottom of the shell 1 and through the opening 97 into the shell 1 and eventually to the bottom of the shell, or from the bearing sleeve 90 of the connecting rod 91 and eventually to the bottom of the shell 1 that surrounds the compressor.

The oil pump 74 may be of any suitable type. In the form of construction shown, it is a gear pump. It is supported by means of a bracket 131 that is secured to a projecting part of the frame 24. It is operated by means of a small balanced crank 132 having a finger or crank part that extends into the cap 94. The axis of the crank substantially coincides with the axis of the crank shaft 56 and, consequently, rotation of the crank 55 causes rotation of the crank 132 which operates the pump.

The oil pump draws its oil through the pipe 134 from the bottom of the shell 1 and directs it into the pipe 130. The oil stream subdivides in the fixture 135 from whence it flows into the pipe 130 which leads to the bearings of the motor and the compressor and into the pipe 136, which directs a portion of the oil to the unloader which operates to unload the compressor when the motor is at rest, as described hereinafter. The excess oil that is not used for the bearings, is taken from the passageway 73 on the opposite side of the crank bearing part of the frame 24, and is directed into the nipple 137 which is connected to a valve casing which has a spring loaded check valve to regulate the pressure of the oil within the passageway 73 and the pressure on all of the bearing parts of the system. The surplus oil passes the ball 138 according to the pressure of the spring. The oil then passes through a pipe 139 which extends to the fixture 135, around the inside of the top of the shell 8.

The pipe 139 is provided with a plurality of openings that permit the escape of the oil into a sleeve of fiber or cloth 140 that is supported on the pipe and operates to distribute the oil over the interior surface of the shell 1. The oil flows down over the interior surface of the shell 1 to the bottom of the shell from whence it is again drawn by the pump 74. The sleeve 140 operates to filter the oil and remove therefrom the metal particles that enter the oil at the bearing surfaces. The oil is cooled by contact with the surface of the shell which is in heat conductive relation to the outside atmosphere and is cooled by the operation of the fan 142. The cooled oil descends into the bottom of the shell 1 and surrounds the lower end of the compressor cylinder and thus operates to cool the compressor. The compressor cylinder is provided with a head 145 that is greatly extended in its diameter to form a cooling flange surrounding the cylinder of the compressor. The cylinder head 145 has a diameter sufficient to substantially cover the lower end of the shell so as to convey the heat of compression to all parts of the oil body for distribution of the heat and for removal of the refrigerant liquid that may be entrapped therein. This extensive cooling element eliminates the use of a cooling medium such as water, which requires a special jacketed construction. Also, it provides an efficient cooling means for cooling the exceedingly small valves that are used for controlling the inlet ports, inasmuch as it is impractical to heat insulate the small ports.

The quantity of oil used within the shell 1 is, preferably, such as to afford a sufficient depth to cover preferably the compression chamber of the cylinder, whereby the heat of compression operates to convert the refrigerant liquid, that may be entrained with the lubricant, into a gas and thus cause it to be removed from the body of the oil in the shell 1. The viscosity of the lubricant is thus maintained which maintains its lubricating efficiency.

In order to equalize the pressure of the hermetically sealed motor shell with the pressure of the compressor shell, a tube 148 interconnects the two shells. Preferably, the tube extends from an elbow 149 that is connected to the upper end of the compressor shell 1 to and through the upper end of the motor shell 8 and terminates at the bottom of the motor shell. In the operation of the compressor, there are periods when the pressure varies and wherein the pressure in the compressor shell is less than that in the motor shell, during which time the oil, that may have been collected from the bearings of the motor, is drawn through the pipe 148 back into the compressor shell. The tube 148 has a small diameter which prevents the retention of any appreciable volumes of liquid therein. The shell 8 is not in the path of the refrigerating circuit and therefore practically none of the heated refrigerant gas in the motor shell enters the compressor shell 1.

The compressor piston 155, which is connected to the crank 55 by the connecting rod 91, is formed of a sheet metal drawing which has been hardened and ground and is so formed as to accurately fit the cylinder 156. It is so designed that it will maintain its cylindrical shape notwithstanding the reciprocating and compression loads imposed upon it. Preferably, the skirt of the piston has a length that is substantially one-half the length of the cylinder forming a large lateral bearing surface as between the piston and the cylinder. The piston is also so formed as to secure the end of the connecting rod 91 to the piston without distorting the wall of the piston and also without extending the piston pin through the wall which otherwise not only weakens the wall of the piston, but also reduces the effectiveness of the piston in its sealing function which is essential where gas compression is required. The piston is also so formed that piston rings are not required by reason of the close fitting of the piston with the cylinder and the large sealing area that is provided.

A block 157 is secured in the piston. Preferably, the lower part of the piston is provided with a shoulder 158 against which the block is seated. The block is secured by means of the ring 159 which engages the peripheral portion of the block. The ring 159 is secured by thinning the skirt of the piston at its edge portion and swedging the edge of the skirt over the edge of the ring 159, this end portion of the piston having been left soft in the hardening process. This secures the block 157 in position.

In advance of securing the block in position, a piston pin 160 is inserted through the block and through the connecting link 91, which connects the link 91 to the piston when the block is secured in the piston. The piston pin 160 is hollow and is hardened and ground to size, forming a very rigid connection between the link and the piston. It is also formed to fit an opening formed in the cylindrical block 157. The block is also provided with a plurality of openings 161 that extend in a direction parallel to the axis of the block and of the piston to conduct the oil through the block and to the piston pin. The block is also provided with transversely extending passages or openings 162 that conduct the oil to the bearing pin. Slots are also formed in the block 157 extending along the surface of the piston pin 160 which transfers the oil over the surface of the piston pin. Also, the block is formed to have a rectangular slot 166 into which the end of the connecting link 91 extends so that the link 91 may surround the pin. The block is thus formed to support the piston pin throughout substantially its entire length and to transmit these forces without a material deflecting force on the pin or on the wall of the piston. The construction is such as to reduce the force applied to the piston pin to a shearing force. This enables the use of a piston having a very thin wall and without distortion of the wall of the piston.

The cylinder head 145 is connected to the frame 24 by means of the bolts 170 which extend through a flange 171 and also through the cylinder head 145. An auxiliary cylinder head 172 is also secured by the bolts 170 on the outside of the cylinder head 145. The frame 24 is also provided with a chamber 173 in which is located a heat insulating block 174 which is enclosed by the end plate casting 175. The end plate casting 175 is connected to the frame 24 by means of the bolts 177 which extend through bosses 178 formed on the frame 24 and through flanges of the casting 175. The auxiliary cylinder head is also provided with chambers 180 in which heat insulating blocks 181 are located. The insulating blocks located in the chambers 173 and 180 have passageways formed therein to permit the movement of the refrigerant materials to the cylinder of the compressor. The insulating blocks are, preferably, formed of balsa wood or cork that operate to heat insulate the refrigerant gases from the heat of compression produced in the cylinder, as they enter the cylinder, and so that the gases enter the cylinder at the lowest possible temperature. The heat insulating blocks are, in each case, formed of two parts that are suitably secured by the associated parts of the compressor.

The block 174 is formed of two parts 184 and 185 which are secured in position in the chamber 173 by means of the cylindrical sleeves 156 that form the cylinder of the compressor. The sleeves protrude into cylindrical openings formed in the walls of the two parts of the block. The cylindrical sleeves 156 are, preferably, formed of hardened and ground steel in order that the piston may accurately fit them and greatly extend the life of the compressor. The length of the cylindrical sleeves 156 are such as to locate the passageway 186 within the block 174 at a point such that the passageway will be opened by the piston at one extreme point in its movement. The passageway 186 extends completely around the piston so as to form an exceedingly large port that is uncovered by the piston. Preferably, the juxtaposed edges of the cylindrical sleeves 156 are so formed as to produce a Venturi section for the passageway 186 into the interior of the compressor.

The block 181 is also formed of two parts 187 and 188 so as to form the passageway 189. The block 181 is formed substantially Y-shaped and forms thereby a divided path to conduct the incoming gases to two slotted ports 190 formed in the head 145, whereby the gases will be heat insulated until they enter the compressor.

The passageway 186 is opened and closed by the movement of the piston 155, while the passageways 186 are closed and opened by a pair of valves 192. The valves 192 are, preferably, spring valves and are located in annular slots formed in the head 145 of the cylinder. They are of a length sufficient to cover the slotted ports 190, and extend to a considerable distance, measured arcuately, from the one end of each of the said ports to allow for deflection of the springs. Thus, when the piston is raised, gases are drawn into the ports 190. The difference in pressure on opposite sides of the spring valves causes the springs to be raised as the gas enters the compressor. Upon the completion of the stroke of the piston, the port 186 is opened which allows an influx of gas which entirely fills the cylinder. Upon the return stroke, the gas is compressed and forced out through an opening that is covered by a spring pressed valve. The stroke is such as to locate the end of the piston substantially at the head 145 upon the completion of the stroke.

Preferably, the spring valves 192 are double leaf springs. Each valve is provided with a leaf 195 which may be formed of thin sheet metal and the leaf 196, which may be made of the same rigid, though elastic, material. The leaf 195 of each valve provides an exceedingly responsive leaf that immediately opens and closes the ports at very slight changes of pressure while the leaf 196 co-acts therewith to form a stop and aid the leaf 195 in opening. The upper leaf 196 extends into the cylinder slightly and when the piston completes its stroke, it depresses the leaf 196 against the leaf 195 to reinforce the leaf 195 and, when the piston returns, the film of oil between the leaves operates to cause them to cohere slightly and so that when the leaf 196 rises by reason of its elasticity and its release by the movement of the piston, the leaf 195 will be raised by the leaf 196 to open the port and admit the gas immediately into the cylinder. When the piston moves to uncover the port 186, the sudden releasement of the pressure enables each leaf 195 to close a port 190.

In order to completely exhaust the cylinder, the cylinder head 145 is provided with a venturi shaped passage at its center and also the piston is provided with a truncated conical projection 197, which partially fills the venturi shaped outlet 198 and conforms substantially thereto in shape and thereby removes the clearance volume of the outlet passage. The end of the truncated conical projection 197 extends to the valve 200 when the piston has completed its stroke. The valve 200 is a disc that is spring pressed by means of the springs 201 and, moreover, is connected to a valve block 202 that is spring pressed by means of the spring 203. The disc 200 is pressed against the head 145 by means of the springs 201 which are arranged about the center of the disc to prevent any cocking of the disc in response to the changes in pressure. The block 202, moreover, forms a stop which limits the travel of the disc 200 and acts as a guide for the disc. The springs 201 are located in sockets 204. Also, the disc is provided with a central pin 205 that is located in a socket 206 for guiding the disc in its movements relative to the block 202. The block has a stem 207 that moves in the sleeve 208. The sleeve is also provided with a stem 209 that is secured by means of a nut 210 to the auxiliary compressor head 172. The spring 203 is located intermediate the shoulder formed on the block 202 and the wall of the auxiliary cylinder head 172. The spring 203 is not under any initial tension, but is of a length to position the block 202 at a point slightly remote from the cylinder head 145 and to place the disc 200 in operative relation with respect to the port 198. The lower end of the block is, preferably, tapered in order to increase progressively the cross sectional area of the outlet passage within the auxiliary head which enables a free movement of the gases when the valve is open. The passageway about the block is designed so as to be substantially equal to the area of the outlet as provided by the valve disc when it is removed from its seat.

The auxiliary cylinder head has a steel sleeve 212 that surrounds the valve assembly and forms a passage for the gases as they are discharged from the compressor. It is connected to the pipe 213 which extends through the top of the shell 1. A suitable connector 214 connects the pipe 213 with the refrigerating circuit.

The return of the refrigerating circuit is through the pipe 220. The refrigerant is directed into a member 221 formed of heat insulating material. It has a chamber 222 that is so formed as to trap the gases that may enter through the pipe 220 and pass the liquids to the bottom of the shell. Preferably, the pipe 220 enters at one side of the chamber 222 and a pipe 223 extends to near the top of the chamber and at a point disaligned from the entrance through which the pipe 220 communicates with the chamber 222. Thus the gases will readily pass from the pipe 220 to the pipe 223 while the liquids will be collected in the chamber 222. The bottom of the chamber 222 is provided with an opening 224 which affords an outlet for the liquids that are separated from the vapors returned from the refrigerating circuit. The liquids pass to the bottom of the shell where they mingle with the oil. The liquids that are thus returned to the bottom of the shell 8 are liquid refrigerant and oil. The liquids in the bottom of the shell are heated by the heat of compression and, consequently, the liquid refrigerant is converted into a gas and caused to rise to the top of the shell, since the shell is connected through the member 221 with the low pressure side of the system.

The member 221 is formed of pressed cork or balsa wood or other heat insulating material. It may be formed of two parts that are secured together by a suitable sheet metal shell 225. The pipe 223 extends into a tubular heat insulating body 226 that is connected to the lower end of the heat insulating member 221 and then in turn communicates with the U-shaped block 174 that is located in the chamber 173 of the frame 24 of the compressor. Thus within the shell 1 the gases passing through a heat insulated passageway prevents the heat of the compressor from heating the gases in advance of their entrance into the compressor.

The shell containing the compressor has a volume that enables the location of the member 221 well above the level of the oil that is contained within the shell and, moreover, the volume within the shell above the level of the oil is very much greater than the member 221, consequently, the reciprocatory movements of the piston will not cause any variation in the pressure within the chamber 222 by reason of the ratio of the volume of the shell to the volume of displacement of the piston. Thus the member 221 may provide for an outlet for the liquids returned to the compressor so as to permit the liquids to flow directly into the shell. This also enables the refrigerant liquid to be converted into a gas and, furthermore, enables the movement of such gas into the low pressure side of the refrigerant system, namely, through the opening in the member 221. The member being heat insulated provides a means for maintaining the cold gas from the low pressure side of the refrigerating circuit at the temperature at which it is received at the compressor, notwithstanding the heat that exists in the shell, which is produced by the work of compression, notwithstanding the cooling means which is provided for cooling the compressor through the movement of the oil over the surface of the shell. In view of the large volume of the shell above the level of the oil, a very little of the heated gas will enter the chamber 222 the only amount that will enter will be the refrigerant material that is entrapped in the oil and removed therefrom by the heat of compression. Furthermore, the shell being considerably larger than the compressor, forms not only a relatively large oil reservoir, but also enables the location of the insulated gas and liquid separator at a point well above the liquid of the oil to prevent closing of the outlet of the separator for the liquids by the foaming of the oil due to the absorption or entrainment of the refrigerant liquid in the oil and the expansion thereof by the heat of the compressor.

In order that the gases, that enter through the valves 196 and 195, may be likewise heat insulated from the heat of the compressor, the U-block 174 is connected to the Y-block 181 by means of a heat insulating tubular part 227. Thus the entering gases will be completely heat insulated while the liquids that enter with the gases will be discharged into the oil body contained within the shell and the refrigerant liquid will be driven off from the oil and will eventually find its way through the opening 224 whereby such gas will be introduced into the refrigerating circuit.

Inasmuch as it is desirable to operate the compressor by an induction motor, it is essential that an unloader be used for unloading the compressor to enable the operation of the motor which is directly connected to the compressor through the shaft 17 and the crank shaft 56. The unloader operates, not only to unload the compressor, but also to unload the oil pump so as to enable the rotor of the motor to rotate quite freely. The unloader operates through the change in oil pressure to open the passageways in the compressor cylinder and also a passageway to short circuit the lubricating circuit.

In the form of construction shown, the unloader 230 is connected to a fixture 135 by the means of the pipe 136. The fixture 135 has a ball check valve 231 which coacts with the collar 232, having a conical seat that is provided with serrations or channels 233, to enable at least some leakage by the check valve 231. The movement of the check valve 231 is limited by means of the pin 234. When the oil pump is in operation, the check valve is seated on the collar 232 to substantially reduce the cross sectional area of the passageway through the pipe 136. The pressure that is thus transmitted is communicated to the oil located in the cylinder 235 in which is located a piston 236 that is spring pressed in opposition to the pressure created by the oil pump by means of the spring 237. The piston 236 is connected to a push rod 238 that extends through a sleeve 239. The push rod 238 is connected to a lever 240 that is pivotally supported on the cylinder head 145, located in the auxiliary cylinder head 172. The interior of the sleeve 239 and the chamber in which the lever 240 is located, is sealed as against the admission of the oil from the oil body contained in the shell. The lever 240 has a valve 241 that controls the opening 242 formed in the cylinder head 145 and so that when the oil pressure in the piston 235 is sufficiently reduced that the piston 236 may be operated by the spring 237, the valve 241 will be opened. This opens a communication to the interior of the shell through the chamber in the auxiliary cylinder head, the sleeve 239 and the openings 243 formed in the cylinder 235, at a point beneath the piston 236. When, therefore, the piston of the compressor is operated, the gases may freely exhaust through this passageway which eliminates the back pressure to a large extent. When, however, the compressor and the oil pump are operated, the piston 236 moves downward and holds the valve 241 against its seat to efficiently prevent movement of the gases through the opening 242, notwithstanding the very high pressure that may be created by the piston of the compressor. The cylinder 235 and piston 236 are so constructed that in case any oil works by the piston 236, it will pass out through the openings 243 and will not pass down through the sleeve 239 and enter the compressor.

The shell 1 of the compressor, moreover, being large relative to the compressor, enables the location of the cylinder 235 well above the level of the liquid and, consequently, enables the location of the upper end of the passageway leading from the compressor cylinder at a point well above the level of the oil and also above the level to which the oil will be raised by the foaming action produced by heating entrained refrigerant within the oil. This produces a means whereby the pressures on opposite sides of the piston will, in the starting operation of the motor, be substantially the same. This enables the induction motor to start.

Also, when the movement of the piston 236 is completed, the check valve 231 drops from its seat by gravity which permits free operation of the spring 237 when the pump ceases to operate, and if there is any leakage by the piston it will be supplied through the pipe 136 from the pump.

The oil pump is also unloaded by means of the check valve 100 which is weighted by the weight 101, for immediately upon the cessation of the operation of the motor, the check valve will be released from its seat. This will unload the oil from the pump by establishing a free passageway into the compressor shell until the speed of the compressor reaches a predetermined rate when the passageway will be closed by the centrifugal action of the weight 101 to close the valve 100.

In the particular form of construction shown, a split phase induction motor is used for operating the compressor. Referring to the diagram, the resistance coil 250 is connected in the circuit of the poles of the stator. The rotor is a squirrel cage and operates in the manner well known in the art in response to the changing field of the stator. In order to produce the desired lead of the magnetic field, the resistance coil 250 is connected in the circuit and when the speed of the rotor reaches the desired rate, the resistance coil is disconnected from the circuit. In the form of construction shown, the circuit of the resistance coil 250 is opened after the expiration of a definite time interval during which time the compressor reaches the desired speed. The switch for opening the circuit of the resistance coil 250 is a centrifugal switch that is operated by an auxiliary motor, preferably connected in parallel to the compressor motor. A means for delaying the responsiveness of the auxiliary motor is utilized for extending the period in which the compressor motor may acquire the desired speed. In the form of construction shown, the auxiliary motor is provided with a fan 251 which performs the double function of delaying the acceleration of the auxiliary motor 252 and also for directing a stream of air against the surfaces of the shells 1 and 8 to cool the said surfaces and eliminate the waste heat both of the motor and of the compressor.

In connection with refrigerating systems, operated by an induction motor driven compressor, it is desirable to provide a temperature control switch for opening the circuit of both the compressor motor and the control motor, such as the switch 253. The starting of the motor will be controlled by the temperature control switch 254 which will complete the circuit of the motor when the conditions in the refrigerating system require the decrease of temperature. Preferably, to protect the system against injury, a time limit circuit breaker 253 is placed in the circuit. The refrigerating system operates in cycles in the manner well known in the art.

In the form of construction shown, the shell 8 of the motor is formed of two parts 10 and 11 which are connected together by means of the bolts 12. The part 10 tightly fits the laminated sections that form the fields of the stator and in order to secure it in position, a heavy lamination, or sheet, 258, forming a part of the laminated cores, is secured between the flanges 13 by the bolts 12. The close fitting, as between the shell 8 and the stator, places the two in a high heat conductive relation whereby the waste heat of the motor will be readily transmitted to the exterior surface of the shell where it may be dissipated by the atmosphere and particularly by the stream of air induced by the fan 142.

In order to aid in the dissipation of the heat of the motor, a plurality of fins 259 are attached to the shell 8, and particularly at that part of the shell with which the stator is directly in contact, and through which the heat flows.

The shell 1 is, preferably, provided with a ring 262 that is spaced from the inner surface of the shell 8 by the gasket 263 and so as to form an annular well or pocket 264 for the collection of the oil at the joints between the parts of the shell 1. This operates to maintain a body of oil at the joint which coacts to prevent leakage through the joint. Preferably, an auxiliary valve is located intermediate the compressor pump and the refrigerating circuit on the high pressure side. This is to prevent a back flow of the refrigerating material upon an unusual rise of pressure, or in case the outlet valve of the compressor pump becomes leaky. The check valve 265 seats on the end of the connector 266. It is spring pressed by means of a spring 267 located intermediate a shoulder formed on the end of a second connector 268 and the valve member 265, which is a disc valve. Preferably, the valve 265 is located in the housing 269 which has considerable volume, a larger cross sectional area relative to a cross sectional area of the pipes leading thereto and away from the housing to reduce the velocity of the gas as it enters the housing. Preferably, a flaring cup 270 is located around the inlet that is controlled by the valve 265 to direct the gas and any liquids that may be contained therein outwardly. The liquid collects in the space exterior to the cup 270 and when the flow of the refrigerant gas ceases, the liquid leaks beneath the lower edge of the cup 270 so as to cover the valve 265 and form thereby a cooperative means for sealing the valve as against the return of the refrigerant gas.

I claim:

1. In a compression refrigerating system, a compressor, a thermic insulating member forming a chamber and a passageway for conducting the gas refrigerant to the intake port of the compressor to prevent the heat of the compressor from heating the gas in advance of its compression, the said chamber operating to permit expansion of the gas and the separation of liquids contained in the refrigerant circuit prior to the induction of the gas into the compressor.

2. In a compression refrigerating system, a compressor, a thermic insulating member forming a chamber and a passageway for conducting the gas refrigerant to the intake port of the compressor to prevent the heat of the compressor from heating the gas in advance of its compression, the said chamber operating to permit expansion of the gas and the separation of liquid contained in the refrigerant circuit returning to the compressor, and means for directing the liquid to a point where the heat of the compression will separate the liquid refrigerant from the liquid lubricant.

3. In a compression refrigerating system, a compressor, means for separating the refrigerant gas from liquid contained in the refrigerating circuit by displacement and means for directing the gas to the compressor and the refrigerant and lubricant liquid only to a point that is in greater heat conductive relation to the compressor to separate the refrigerant from the oil by distillation and means for directing the refrigerant gas separated by distillation to the compressor.

4. In a compression refrigerating system, a compressor, a shell for enclosing the compressor, an insulating member located in the shell and having a chamber, the member located at the compressor and in the circuit of the refrigerating system, the chamber having means for separating liquids from the refrigerant gas.

5. In a compression refrigerating system, a compressor having a lubricant reservoir, a member having a chamber and heat insulating walls located at the compressor, and having means for separating liquids from the refrigerant gas and returning the liquid to the lubricant reservoir of the compressor.

6. In a refrigerant compressor for refrigerating apparatus, a shell for containing oil and communicating with the low pressure side of the apparatus, the cylinder of the compressor having a part extended within the oil for conducting the heat of compression to the oil in the bottom of the shell and means for conducting oil to the moving parts of the compressor from that portion of the oil heated in the shell by the heat of compression in the cylinder.

7. In a compression refrigerating system, a compressor, a motor for operating the compressor, the crank shaft of the compressor connected to the shaft of the motor, the said shafts having chambers formed axially therein, a part located in one of the shafts having directive passageways therein, an oil pump for directing oil to the part to direct the oil through divided circuits, one through the crank shaft and the other through the motor shaft.

8. In a compression refrigerating system, a compressor, a lubricating circuit therefor, comprising an oil pump, a shell surrounding the compressor and forming at its lower end a reservoir for oil, means for directing streams of oil against the inner surface of the upper end of the shell to continuously maintain a stream of oil substantially covering the inner surface of the shell and in heat conductive relation therewith to dissipate the heat in the oil.

9. In a refrigerant compressor, a shell for containing oil, the compressor located within the shell and having a part extending into the oil for conducting the heat of compression to the oil in the bottom of the shell, and means for conveying the oil contiguous to the hotter portion of the compressor to moving parts of the compressor for lubrication.

10. In a refrigerating apparatus, a shell subject to the pressure of the low pressure side of the refrigerating apparatus, a compressor located in the shell, means for directing the refrigerant liquid and gas and the lubricant liquid into the shell, a compressor having a part located within the shell, means for directing the oil to the bottom of the shell for conducting the heat of compression to the body of the oil in the shell and to remove the refrigerant from the lubricant.

11. In a compression refrigerating system, a compressor, means comprising a chamber having heat insulating walls and located in proximity to the compressor for separating the refrigerant gas from liquid contained in the refrigerating circuit by displacement and means for directing the gas to the compressor and the refrigerant and lubricant liquid to a point that is in greater heat conductive relation to the compressor to separate the refrigerant from the oil by distillation, and means for directing the refrigerant gas separated by distillation to the compressor.

12. In a refrigerant compressor for refrigerating apparatus, a shell for containing oil and communicating with the low pressure side of the apparatus, the cylinder of the compressor having a flange part located in the bottom of the shell and within the oil for conducting the heat of compression to substantially all the oil in the bottom of the shell, means for conducting oil to the moving part of the compressor from the oil heated in the shell by the flange.

PHILIP W. DES ROCHES.